(12) United States Patent
Xing et al.

(10) Patent No.: US 10,339,082 B2
(45) Date of Patent: Jul. 2, 2019

(54) TECHNOLOGIES FOR STABLE SECURE CHANNEL IDENTIFIER MAPPING FOR STATIC AND DYNAMIC DEVICES

(71) Applicant: Intel IP Corporation, Santa Clara, CA (US)

(72) Inventors: Bin Xing, Hillsboro, OR (US); Pradeep Pappachan, Hillsboro, OR (US); Reshma Lal, Hillsboro, OR (US); Siddhartha Chhabra, Portland, OR (US); Mark Shanahan, Raleigh, NC (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/827,564

(22) Filed: Nov. 30, 2017

(65) Prior Publication Data

US 2019/0163657 A1 May 30, 2019

(51) Int. Cl.
*H04L 9/06* (2006.01)
*G06F 13/16* (2006.01)
*G06F 13/30* (2006.01)
*G06F 21/57* (2013.01)

(52) U.S. Cl.
CPC .......... *G06F 13/30* (2013.01); *G06F 13/1668* (2013.01); *H04L 9/06* (2013.01); *G06F 21/572* (2013.01)

(58) Field of Classification Search
CPC .......................... G06F 21/572; G06F 13/1668
See application file for complete search history.

(56) References Cited

U.S. PATENT DOCUMENTS

| | | | |
|---|---|---|---|
| 10,055,218 B2 * | 8/2018 | Hsu .................. | G06F 8/654 |
| 2004/0268337 A1 * | 12/2004 | Culter .................. | G06F 9/485 717/168 |
| 2017/0372076 A1 * | 12/2017 | Poornachandran ... | G06F 21/575 |

* cited by examiner

*Primary Examiner* — Glenn A. Auve
(74) *Attorney, Agent, or Firm* — Barnes & Thornburg LLP

(57) ABSTRACT

Technologies for secure channel identifier mapping include a computing device having an I/O controller that may connect to one or more I/O devices. The computing device determines a device path to an I/O device that may be used to identify the I/O device. The computing device identifies a firmware method as a function of the device path and invokes the firmware method. In response, the firmware method determines a channel identifier as a function of the device path. The firmware method may determine a predetermined channel identifier for static or undiscoverable I/O devices. For dynamic I/O devices, the firmware method may determine the channel identifier using a stable algorithm. The I/O controller may assign the channel identifier to the dynamic I/O device using the same stable algorithm. The computing device establishes a secure channel to the I/O device using the channel identifier. Other embodiments are described and claimed.

25 Claims, 4 Drawing Sheets

```
    Device(\_SB.PCI0) {                                                          400
      Device(P2P0) {
        Name(_ADR, 0x140000);   // Device 20 Function 0
402     Device(USB0) {          // Hot-pluggable controller
          Name(_ADR, 0xA0000);  // Device 10 Function 0
404       Method(MAPC, 1) {     // Maps device path tail (Arg0) to CID
            ... ...     212
          }
          Method(HASC, 1) {     // True if CID (Arg0) identifies a
                                // USB endpoint
            Return(Lequal(And(Arg0, ControllerIDMask), ControllerID));
          }
        }
      }
406
      Device(SomeOtherDevice) { // Statically connected device
        Name(_ADR, 0x1F0001);   // Device 31 Function 0
        Method(MAPC, 0) {       // Returns fixed CID
408       Return(CIDofThisDevice);
        }              218
      }
    }
```

FIG. 4

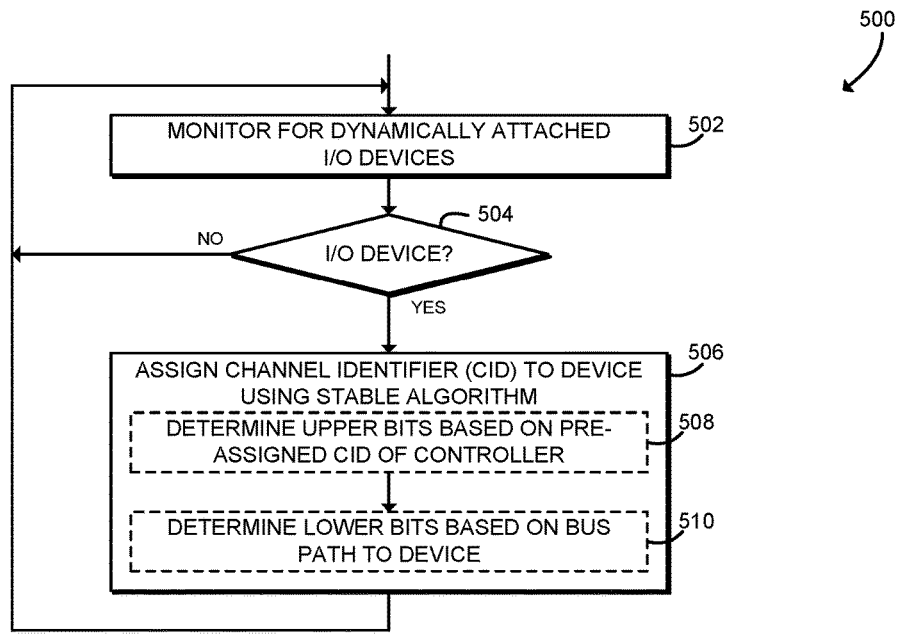

TECHNOLOGIES FOR STABLE SECURE CHANNEL IDENTIFIER MAPPING FOR STATIC AND DYNAMIC DEVICES

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 is a pseudocode diagram of at least one embodiment firmware methods that may be executed by the computing device of FIGS. 1-2; and FIG. 5 is a simplified flow diagram of at least one embodiment of a method for secure channel identifier mapping that may be executed by an I/O controller of the computing device of FIGS. 1-2.

DETAILED DESCRIPTION OF THE DRAWINGS

Figure 1:
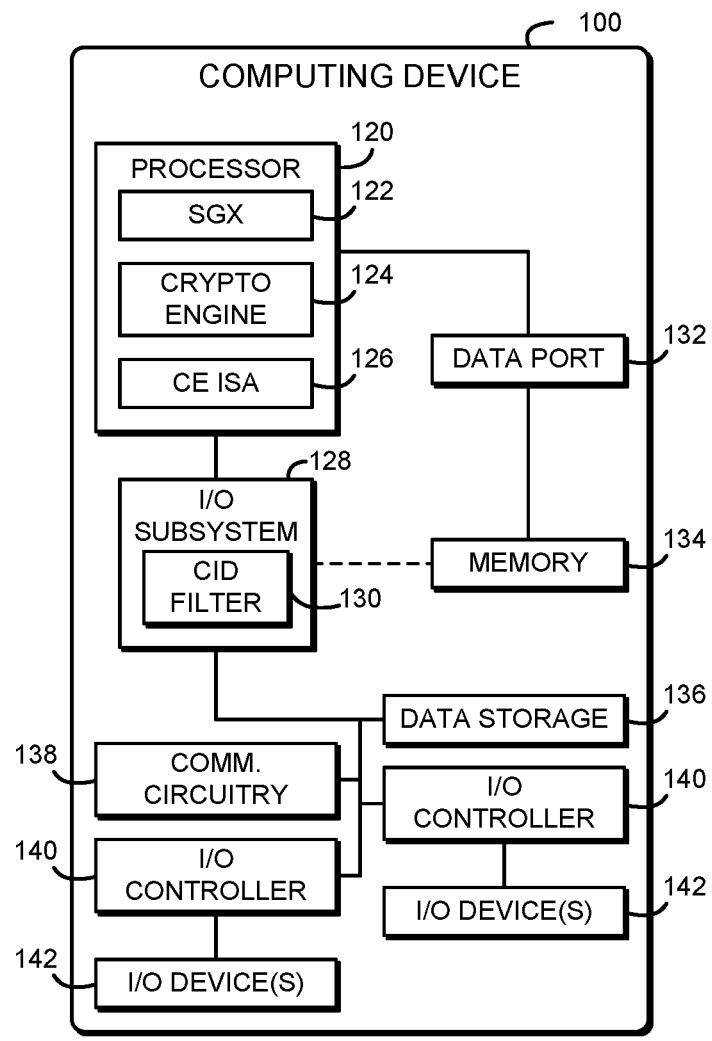
FIG. 1 is a simplified block diagram of at least one embodiment of a computing device for secure channel identifier mapping.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure channel identifier mapping is shown. The illustrative computing device 100 includes one or more I/O controllers and associated I/O devices that are capable of secure I/O protected by a channel identifier (CID). To prepare for secure I/O, the computing device 100 determines a device path for each I/O device. The device path may be based on a hardware topology or other relationship between components of the computing device 100 that can be enumerated by an operating system of the computing device 100. The computing device 100 uses the device path to invoke a firmware method that generates a CID as a function of the device path. The CID may be predetermined for static devices or generated using a stable mapping algorithm for dynamically attached devices. The I/O controller uses the same stable mapping algorithm to assign CIDs to I/O devices. Thus, the computing device 100 may convert from device paths available to the operating system to CIDs, which are discrete numbers that are not necessarily related to the hardware topology. Accordingly, the operating system or other untrusted software of the computing device 100 may positively map between I/O devices and secure channels, which may prevent certain denial-of-service attacks without comprising security of the secure channels. Additionally, the computing device 100 may also securely determine the CIDs for dynamically attached I/O devices that are not available at system design time. Thus, the computing device 100 may provide scalable, secure I/O for dynamic I/O devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a channel identifier (CID) filter 130, a memory 134, a data storage device 136, and one or more I/O controllers 140. Additionally, in some embodiments, one or more of the illustrative components may be incorporated in, or otherwise form a portion of, another component. For example, the memory 134, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 134. The secure enclave support 122 may be embodied as a set of processor instruction extensions that allows the processor 120 to establish one or more secure enclaves in the memory 134. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 142. In particular, as described further below, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 130, described further below. For example, the cryptographic engine ISA 126 may include a processor instruction to bind programming instructions or other data to the cryptographic engine 124, the CID filter 130, an I/O controller 140, and/or other components of the computing device 100, a processor instruction to unwrap the bound programming instructions and provide them to the target component over a sideband network or other secure fabric of the computing device 100, a processor instruction to securely copy and encrypt data from the TIO PRM region to an unprotected memory buffer, and/or other processor features.

The memory 134 may be embodied as any type of volatile or non-volatile memory or data storage capable of performing the functions described herein. In operation, the memory 134 may store various data and software used during operation of the computing device 100 such as operating systems, applications, programs, libraries, and drivers. As described further below, the memory 134 may also include the TIO PRM region. The memory 134 is illustratively connected with a data port 132 to send and receive data from the processor 120 and the I/O subsystem 128. Additionally or alternatively, the memory 134 may be communicatively coupled to the processor 120 via the I/O subsystem 128, which may be embodied as circuitry and/or components to facilitate input/output operations with the processor 120, the memory 134, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 134 may be directly coupled to the processor 120, for example via an integrated memory controller hub. The I/O subsystem 128 may further include a sideband network, secure fabric, or other secure routing support. The secure routing support may include hardware support to ensure I/O data cannot be misrouted in the I/O subsystem 128 under the influence of rogue software. The secure routing support may be used with the CID filter 130 to provide cryptographic protection of I/O data. Additionally, in some embodiments, the I/O subsystem 128 may form a portion of a system-on-a-chip (SoC) and be incorporated, along with the processor 120, the memory 134, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 134.

The data storage device 136 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 138, which may be embodied as any communication circuit, device, or collection thereof, capable of enabling communications between the computing device 100 and other remote devices over a computer network (not shown). The communications subsystem 138 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 130 may be embodied as any hardware component, functional block, logic, or other circuit that performs channel identifier (CID) filtering function(s), including filtering I/O transactions based on CIDs inserted by the I/O controllers 140. For example, the CID filter 130 may observe DMA transactions inline, perform test(s) based on the CID and memory address included in the transaction, and drop transactions that fail the test(s). In the illustrative embodiment, the CID filter 130 is incorporated in the I/O subsystem 128. In other embodiments, the CID filter 130 may be included in one or more other components and/or in an SoC with the processor 120 and I/O subsystem 128 as a separate component.

Each of the I/O controllers 140 may be embodied as any USB controller, embedded controller, microcontroller, microprocessor, functional block, logic, or other circuit or collection of circuits capable of performing the functions described herein. In some embodiments, one or more of the I/O controllers 140 may be embedded in another component of the computing device 100 such as the I/O subsystem 128 and/or the processor 120. Additionally or alternatively, one or more of the I/O controllers 140 may be connected to the I/O subsystem 128 and/or the processor 120 via an expansion bus such as PCI Express (PCIe) or other I/O connection. As described above, the I/O controllers 140 communicate with one or more I/O devices 142, for example over a peripheral communications bus (e.g., USB, Bluetooth, etc.). The I/O devices 142 may be embodied as any I/O device, such as human interface devices, keyboards, mice, touch screens, microphones, cameras, and other input devices, as well as displays and other output devices. The I/O controllers 140 and associated DMA channels may be uniquely identified using identifiers called channel identifiers (CIDs). Each I/O controller 140 may assert an appropriate CID with every trusted I/O DMA transaction, for example as part of a transaction layer packet (TLP) prefix, to uniquely identify the source of the DMA transaction and provide liveness protections. The CID also enables the isolation of I/O from different devices 142.

Figure 2:
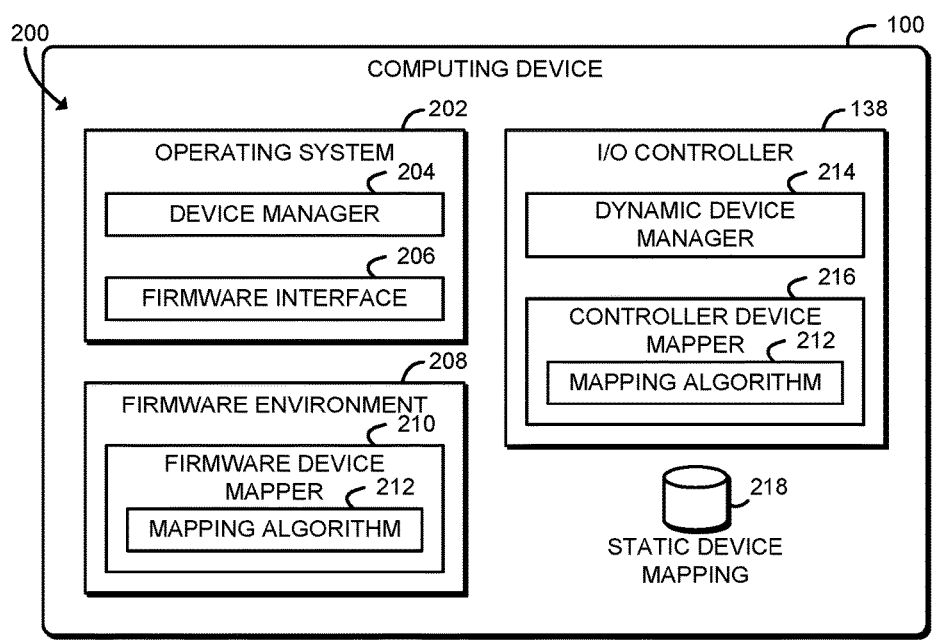
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 300 includes an operating system 202, a firmware environment 208, and an I/O controller 140. The operating system 202 further includes a device manager 204 and a firmware interface 206, the firmware environment 208 further includes a firmware device mapper 210, and the I/O controller 140 further includes a dynamic device manager 214 and a controller device mapper 216. The various components of the environment 200 may be embodied as hardware, firmware, software, or a combination thereof. As such, in some embodiments, one or more of the components of the environment 200 may be embodied as circuitry or collection of electrical devices (e.g., device manager circuitry 204, firmware interface circuitry 206, firmware device mapper circuitry 210, dynamic device manager circuitry 214, and/or controller device mapper circuitry 216). It should be appreciated that, in such embodiments, one or more of the device manager circuitry 204, the firmware interface circuitry 206, the firmware device mapper circuitry 210, the dynamic device manager circuitry 214, and/or the controller device mapper circuitry 216 may form a portion of the processor 120, the I/O subsystem 128, the I/O controller 140, and/or other components of the computing device 100. Additionally, in some embodiments, one or more of the illustrative components may form a portion of another component and/or one or more of the illustrative components may be independent of one another.

The operating system 202 may be embodied as any operating system, hypervisor, virtual machine monitor, and/or other executive component of the computing device 100 that manages hardware of the computing device 100 and otherwise controls runtime execution of the computing device 100. The firmware environment 208 may be embodied as an ACPI BIOS firmware, a UEFI firmware, or any other firmware environment executed by the processor 120 of the computing device 100. The firmware environment 208 may establish a pre-boot firmware execution environment in response to a platform reset of the computing device 100 (e.g., a cold boot, warm boot, or other platform reset). The firmware environment 208 may also install or otherwise make available one or more runtime services or other firmware methods that may be invoked by the operating system 202.

The device manager 204 is configured to determine a device path to one or more I/O devices 142 of the computing device 100. The device manager 204 is further configured to establish a trusted I/O channel with one or more I/O devices 142 using a channel identifier (CID) corresponding to each of the I/O devices 142.

The firmware interface 206 is configured to identify a firmware method as a function of a device path and invoke the firmware method. The firmware method may be identified using a node in a firmware table, such as an ACPI object in an ACPI table. For static I/O devices 142, the firmware method may be identified as a device node. For dynamically attached devices coupled to an I/O controller 140, the firmware method may be identified as a controller node associated with the I/O controller 140.

The firmware device mapper 210 is configured to determine a channel identifier (CID) as a function of the device path in response to invocation of the firmware method. For static I/O devices 142, the CID may be determined using a predetermined CID that is associated with the static device 142. The predetermined CIDs may be stored in a static device mapping database 218. For dynamically attached I/O devices 142, the CID may be determined as a function of the device path using a stable mapping algorithm 212.

The dynamic device manager 214 of the I/O controller 140 is configured to detect dynamic attachment of an I/O device 142. The controller device mapper 216 is configured to determine the CID for the I/O device 142 as a function of the corresponding device path using the stable mapping algorithm 212. In some embodiments, the device path may include a controller path and a bus path. The controller path identifies the I/O controller 140, and the bus path includes a path of the I/O device 142 relative to the I/O controller 140. In some embodiments, one or more upper bits of the CID may be determined as a function of a predetermined CID associated with the I/O controller 140, and one or more lower bits of the CID may be determined as a function of the bus path.

Figure 3:
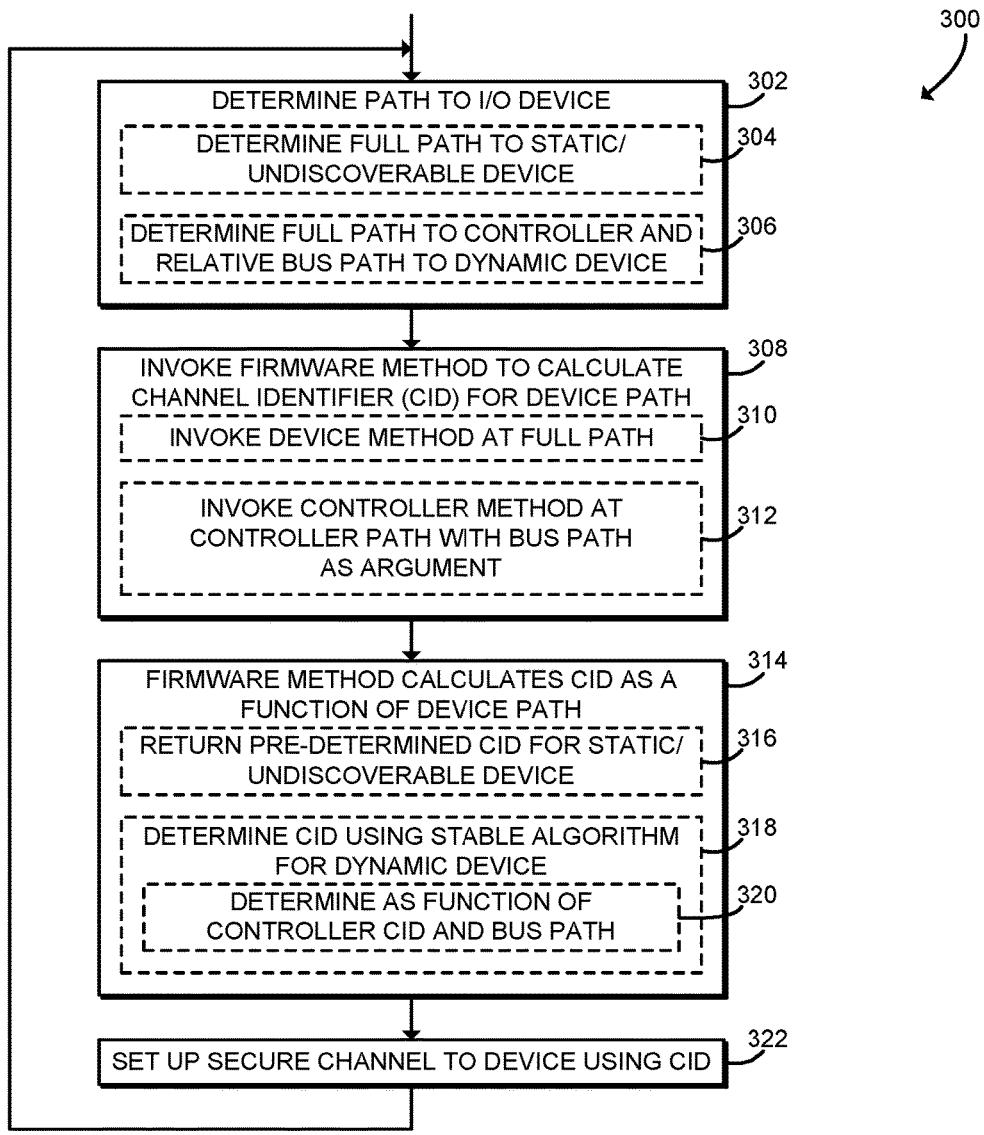
FIG. 3 is a simplified flow diagram of at least one embodiment of a method for secure channel identifier mapping that may be executed by the computing device of FIGS. 1-2.

Referring now to FIG. 3, in use, the computing device 100 may execute a method 300 for secure CID mapping. It should be appreciated that, in some embodiments, the operations of the method 300 may be performed by one or more components of the environment 200 of the computing device 100 as shown in FIG. 2. The method 300 begins in block 302, in which the computing device 100 determines a device path to an I/O device 142. The device path may be embodied as a text string, tree structure, or other data that may be used to identify a particular hardware device of the computing device 100. In some embodiments, the device path may identify the topological, hierarchical, logical, physical, or other relationships between components of the computing device 100 and the I/O device 142. For example, the device path may identify the I/O controller 140 coupled to the I/O device 142, as well as one or more expansion buses or corresponding controllers coupled to the I/O controller 140. The device path may be determined by the operating system 202 or other privileged, untrusted software executed by the processor 120 of the computing device 100. In some embodiments, the device path may be embodied as a path or other identifier in the ACPI namespace that may be used to index a firmware table, such as a Differentiated System Description Table (DSDT), Secondary System Description Table (SSDT), or other ACPI table of the computing device 100.

In some embodiments, in block 304 the computing device 100 may determine a full device path to a static or otherwise undiscoverable I/O device 142. Static devices may be pre-installed and otherwise pre-configured by a manufacturer, system integrator, or other entity associated with the computing device 100. In some embodiments, for dynamic I/O devices 142 such as hot-plugged USB devices, in block 306 the computing device 100 may determine a full device path to the I/O controller 140 coupled to the I/O device 142 as well as a relative bus path to a dynamic I/O device 142. The bus path may be embodied as an index, device path tail, or other data that may be used to identify the I/O device 142 relative to the corresponding I/O controller 140.

In block 308, the computing device 100 invokes a firmware method to determine the channel identifier (CID) for the device path. The computing device 100 may use any appropriate technique to invoke the firmware method. For example, in the illustrative embodiment the computing device 100 may invoke an ACPI machine language (AML) firmware method included in an ACPI table. Additionally or alternatively, the computing device 100 may invoke one or more UEFI runtime firmware protocols or otherwise invoke firmware code to determine the CID. The computing device 100 may provide the device path to the firmware method as an argument or otherwise make the device path available to the firmware method. In some embodiments, in block 310 the computing device 100 may invoke a device method found at the full device path. For example, the computing device 100 may index one or more ACPI tables with the full device path to identify the device method, and then execute that device method. In some embodiments, in block 312 the computing device 100 may invoke a controller method found at the controller path and supply the bus path as an argument to the controller method. For example, the computing device 100 may index one or more ACPI tables with the controller path, and then invoke the controller method with a device path tail or other bus path as the argument.

In block 314, the firmware method executed by the computing device 100 determines the CID as a function of the device path. The firmware method may use any technique that stably determines the CID as a function of the device path and generates the same CID as that generated by the I/O controller 140, as described further below in connection with FIG. 5. In some embodiments, in block 316 the firmware method may return a pre-determined CID for a static or otherwise undiscoverable I/O device 142. The CID may be pre-assigned by the manufacturer, system integrator, or other entity associated with the computing device 100. Thus, in those embodiments the firmware tables and associated firmware methods may include the platform manifest or other static device mapping 218 of the computing device 100.

In some embodiments, in block 318 the firmware method may determine the CID using the stable CID mapping algorithm 212 for a dynamic I/O device 142. For example, the mapping algorithm 212 may be executed to determine a CID for a hotplugged USB device or other device 142 that is dynamically attached to the computing device 100. The stable mapping algorithm 212 may be embodied as any algorithm that predictably generates the same CID given the same input device path. As described further below in connection with FIG. 5, the I/O controller 140 generates the same CID for each dynamic I/O device 142, for example by executing the same mapping algorithm 212. In some embodiments, in block 320 the firmware method may determine the CID as a function of a pre-determined CID assigned to the I/O controller 140 and the bus path of the I/O device 142. For example, one or more upper bits of the CID may be determined using the predetermined CID of the I/O controller 140, and one or more lower bits of the CID may be determined as a function of the bus path. The predetermined CID for the I/O controller 140 may also be stored in the static device mapping 218, for example in the firmware tables or other platform manifest.

In block 322, the computing device 100 sets up a secure I/O channel to the I/O device 142 using the CID for the I/O device 142. The computing device 100 may program the CID filter 130 and/or the cryptographic engine 124 to protect I/O data including the corresponding CID. In use, I/O data with the corresponding CID may be protected from being accessed by untrusted software, including any operating system of the computing device 100. For example, I/O data with the corresponding CID may be stored in a corresponding range of the TIO PRM that is not accessible by software, and a microcode cryptographic engine of the processor 120 may copy and encrypt the I/O data into an ordinary memory buffer. As another example, in some embodiments the I/O data with the corresponding CID may be encrypted by an inline cryptographic engine. After setting up the secure channel, the method 300 loops back to block 302 to continue mapping I/O devices 142.

Referring now to FIG. 4, pseudocode diagram 400 illustrates one or more potential embodiments of firmware methods that may be executed to perform CID mapping. The pseudocode diagram 400 illustrates part of a firmware table such as an ACPI firmware table (e.g., the DSDT or SSDT). As shown, the firmware table includes a controller object 402 corresponding to a USB controller 140. The controller object 402 includes a firmware method 404, named MAPCO. The firmware method 404 may be invoked with the bus path (device path tail) of a dynamic I/O device 142 connected to the I/O controller 140 as its first argument. The firmware method 404 is illustratively embodied as an ACPI machine language (AML) method; however, the firmware method 404 may be embodied as any firmware method, function, protocol, or other routine that may be executed by the computing device 100. As shown, the firmware method 404 includes the stable mapping algorithm 212, which returns the CID as a function of the device path of the I/O device 142. As described further below, the I/O controller 140 may execute the same mapping algorithm 212 to assign the same CID to the I/O device 142.

The firmware table shown in the diagram 400 also includes a device object 406 that corresponds to a static I/O device 142. The device object 406 includes a firmware method 408, also named MAPCO. The firmware method 408 returns a static CID that has been pre-assigned or otherwise pre-determined for the I/O device 142. Thus, in the illustrative embodiment the firmware table itself includes the platform manifest or other static device mapping 218.

Referring now to FIG. 5, in use, the computing device 100 may execute a method 500 for secure CID mapping. It should be appreciated that, in some embodiments, the operations of the method 500 may be performed by one or more components of the environment 200 of the computing device 100 as shown in FIG. 2, such as the I/O controller 140. The method 500 begins in block 502, in which the I/O controller 140 monitors for dynamically attached I/O devices 142. For example, a USB controller may monitor for USB device hotplug events or other device attachment events. In block 504, the I/O controller 140 determines whether a dynamic I/O device 142 has been detected. If not, the method 500 loops back to block 502 to continue monitoring for dynamic I/O devices 142. If an I/O device 142 is detected, the method 500 advances to block 506.

In bock 506, the I/O controller 140 assigns a channel identifier (CID) to the I/O device 142 using the stable mapping algorithm 212. As described above, the stable mapping algorithm 212 may be embodied as any algorithm that predictably generates the same CID given the same input device path. Illustratively, the I/O controller 140 uses the same mapping algorithm 212 as the corresponding firmware method and thus generates the same CID for the I/O device 142. In some embodiments, in block 508 the I/O controller 140 may determine one or more upper bits of the CID based on a pre-assigned CID of the I/O controller 140. The CID of the I/O controller 140 may be assigned by the manufacturer, system integrator, or other entity associated with the computing device 100. The CID of the I/O controller 140 may be included in one or more firmware tables, a platform manifest, or other static device mapping 218 of the computing device 100. Additionally or alternatively, in some embodiments the I/O controller 140 may determine the upper bits of the CID using one or more hardware-based methods, such as strapping pins or fuses. After determining the upper bits, in block 510 the I/O controller 140 may determine one or more lower bits of the CID based on the bus path to the I/O device 142. The bus path to the I/O device 142 is relative to the I/O controller 140. Therefore, the I/O controller 140 may determine the bus path based on a connection to the I/O device 142 or other internal data available to the I/O controller 140. For example, in some embodiments, the bus path may be embodied as a device slot or other index associated with the I/O device 142. After assigning the CID to the I/O device 142, the I/O controller 140 may include that CID in subsequent DMA transactions associated with the I/O device 142. As described above, the computing device 100 (e.g., the cryptographic engine 124 and/or the CID filter 130) may be programmed to provide secure I/O protection for those DMA transactions. The method 500 loops back to block 502 to continue monitoring for dynamic I/O devices 142.

It should be appreciated that, in some embodiments, the methods 300 and/or 500 may be embodied as various instructions stored on a computer-readable media, which may be executed by the processor 120, the I/O subsystem 128, an I/O controller 140, and/or other components of the computing device 100 to cause the computing device 100 to perform the respective method 300 and/or 500. The computer-readable media may be embodied as any type of media capable of being read by the computing device 100 including, but not limited to, the memory 134, the data storage device 136, firmware devices, other memory or data storage devices of the computing device 100, portable media readable by a peripheral device 142 of the computing device 100, and/or other media.

EXAMPLES

Illustrative examples of the technologies disclosed herein are provided below. An embodiment of the technologies may include any one or more, and any combination of, the examples described below.

Example 1 includes a computing device for device identifier mapping, the computing device comprising: a device manager to determine a device path to an I/O device of the computing device; a firmware interface to (i) identify a firmware method as a function of the device path and (ii) invoke the firmware method; and a firmware device mapper to determine a channel identifier as a function of the device path in response to invocation of the firmware method; wherein the device manager is further to establish a trusted I/O channel with the I/O device with the channel identifier in response to a determination of the channel identifier.

Example 2 includes the subject matter of Example 1, and wherein to identify the firmware method comprises to identify a node in a firmware table.

Example 3 includes the subject matter of any of Examples 1 and 2, and wherein the firmware table comprises an ACPI table and the node comprises an ACPI object.

Example 4 includes the subject matter of any of Examples 1-3, and wherein: the I/O device comprises a static device; and to identify the node in the firmware table comprises to identify a device node with the device path.

Example 5 includes the subject matter of any of Examples 1-4, and wherein: the I/O device comprises a dynamically attached device coupled to an I/O controller of the computing device; and to identify the node in the firmware table comprises to identify a controller node associated with the I/O controller with the device path.

Example 6 includes the subject matter of any of Examples 1-5, and wherein: the I/O device comprises a static device; and to determine the channel identifier comprises to determine a predetermined channel identifier that is associated with the static device.

Example 7 includes the subject matter of any of Examples 1-6, and wherein: the I/O device comprises a dynamically attached device coupled to an I/O controller of the computing device; and to determine the channel identifier comprises to determine the channel identifier as a function of the device path using a first stable algorithm.

Example 8 includes the subject matter of any of Examples 1-7, and wherein the I/O controller of the computing device comprises: a dynamic device manager to detect dynamic attachment of the I/O device; and a controller device mapper to determine the channel identifier as a function of the device path with the first stable algorithm in response to detection of the dynamic attachment of the I/O device.

Example 9 includes the subject matter of any of Examples 1-8, and wherein the device path comprises a controller path and a bus path, wherein the controller path identifies the I/O controller, and wherein the bus path comprises a path of the I/O device relative to the I/O controller.

Example 10 includes the subject matter of any of Examples 1-9, and wherein to determine the channel identifier as a function of the device path with the first stable algorithm comprises to determine the channel identifier as a function of the controller path and the bus path.

Example 11 includes the subject matter of any of Examples 1-10, and wherein to determine the channel identifier as a function of the controller path and the bus path comprises to: determine one or more upper bits of the channel identifier as a function of a predetermined channel identifier associated with the I/O controller; and determine one or more lower bits of the channel identifier as a function of the bus path.

Example 12 includes the subject matter of any of Examples 1-11, and further comprising: an operating system that comprises the device manager and the firmware interface; and a firmware environment that comprises the firmware device mapper.

Example 13 includes a method for device identifier mapping, the method comprising: determining, by a computing device, a device path to an I/O device of the computing device; identifying, by the computing device, a firmware method as a function of the device path; invoking, by the computing device, the firmware method; determining, by the computing device, a channel identifier as a function of the device path in response to invoking the firmware method; and establishing, by the computing device, a trusted I/O channel with the I/O device using the channel identifier in response to determining the channel identifier.

Example 14 includes the subject matter of Example 13, and wherein identifying the firmware method comprises identifying a node in a firmware table.

Example 15 includes the subject matter of any of Examples 13 and 14, and wherein the firmware table comprises an ACPI table and the node comprises an ACPI object.

Example 16 includes the subject matter of any of Examples 13-15, and wherein: the I/O device comprises a static device; and identifying the node in the firmware table comprises identifying a device node using the device path.

Example 17 includes the subject matter of any of Examples 13-16, and wherein: the I/O device comprises a dynamically attached device coupled to an I/O controller of the computing device; and identifying the node in the firmware table comprises identifying a controller node associated with the I/O controller using the device path.

Example 18 includes the subject matter of any of Examples 13-17, and wherein: the I/O device comprises a static device; and determining the channel identifier comprises determining a predetermined channel identifier that is associated with the static device.

Example 19 includes the subject matter of any of Examples 13-18, and wherein: the I/O device comprises a dynamically attached device coupled to an I/O controller of the computing device; and determining the channel identifier comprises determining the channel identifier as a function of the device path using a first stable algorithm.

Example 20 includes the subject matter of any of Examples 13-19, and further comprising: detecting, by the I/O controller of the computing device, dynamic attachment of the I/O device; and determining, by the I/O controller, the channel identifier as a function of the device path using the first stable algorithm in response to detecting the dynamic attachment of the I/O device.

Example 21 includes the subject matter of any of Examples 13-20, and wherein the device path comprises a controller path and a bus path, wherein the controller path identifies the I/O controller, and wherein the bus path comprises a path of the I/O device relative to the I/O controller.

Example 22 includes the subject matter of any of Examples 13-21, and wherein determining the channel identifier as a function of the device path using the first stable algorithm comprises determining the channel identifier as a function of the controller path and the bus path.

Example 23 includes the subject matter of any of Examples 13-22, and wherein determining the channel identifier as a function of the controller path and the bus path comprises: determining one or more upper bits of the channel identifier as a function of a predetermined channel identifier associated with the I/O controller; and determining one or more lower bits of the channel identifier as a function of the bus path.

Example 24 includes the subject matter of any of Examples 13-23, and wherein: determining the device path comprises determining the device path by an operating system of the computing device; identifying the firmware method comprises identifying the firmware method by the operating system; and determining the channel identifier comprises determining the channel identifier by a firmware environment of the computing device.

Example 25 includes a computing device comprising: a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for device identifier mapping, the computing device comprising: means for determining a device path to an I/O device of the computing device; means for identifying a firmware method as a function of the device path; means for invoking the firmware method; means for determining a channel identifier as a function of the device path in response to invoking the firmware method; and means for establishing a trusted I/O channel with the I/O device using the channel identifier in response to determining the channel identifier.

Example 29 includes the subject matter of Example 28, and wherein the means for identifying the firmware method comprises means for identifying a node in a firmware table.

Example 30 includes the subject matter of any of Examples 28 and 29, and wherein the firmware table comprises an ACPI table and the node comprises an ACPI object.

Example 31 includes the subject matter of any of Examples 28-30, and wherein: the I/O device comprises a static device; and the means for identifying the node in the firmware table comprises means for identifying a device node using the device path.

Example 32 includes the subject matter of any of Examples 28-31, and wherein: the I/O device comprises a dynamically attached device coupled to an I/O controller of the computing device; and the means for identifying the node in the firmware table comprises means for identifying a controller node associated with the I/O controller using the device path.

Example 33 includes the subject matter of any of Examples 28-32, and wherein: the I/O device comprises a static device; and the means for determining the channel identifier comprises means for determining a predetermined channel identifier that is associated with the static device.

Example 34 includes the subject matter of any of Examples 28-33, and wherein: the I/O device comprises a dynamically attached device coupled to an I/O controller of the computing device; and the means for determining the channel identifier comprises means for determining the channel identifier as a function of the device path using a first stable algorithm.

Example 35 includes the subject matter of any of Examples 28-34, and further comprising: means for detecting, by the I/O controller of the computing device, dynamic attachment of the I/O device; and means for determining, by the I/O controller, the channel identifier as a function of the device path using the first stable algorithm in response to detecting the dynamic attachment of the I/O device.

Example 36 includes the subject matter of any of Examples 28-35, and wherein the device path comprises a controller path and a bus path, wherein the controller path identifies the I/O controller, and wherein the bus path comprises a path of the I/O device relative to the I/O controller.

Example 37 includes the subject matter of any of Examples 28-36, and wherein the means for determining the channel identifier as a function of the device path using the first stable algorithm comprises means for determining the channel identifier as a function of the controller path and the bus path.

Example 38 includes the subject matter of any of Examples 28-37, and wherein the means for determining the channel identifier as a function of the controller path and the bus path comprises: means for determining one or more upper bits of the channel identifier as a function of a predetermined channel identifier associated with the I/O controller; and means for determining one or more lower bits of the channel identifier as a function of the bus path.

Example 39 includes the subject matter of any of Examples 28-38, and wherein: the means for determining the device path comprises means for determining the device path by an operating system of the computing device; the means for identifying the firmware method comprises means for identifying the firmware method by the operating system; and the means for determining the channel identifier comprises means for determining the channel identifier by a firmware environment of the computing device.

The invention claimed is:

1. A computing device for device identifier mapping, the computing device comprising:
   a device manager to determine a device path to an I/O device of the computing device;
   a firmware interface to (i) identify a firmware method as a function of the device path and (ii) invoke the firmware method; and
   a firmware device mapper to determine a channel identifier as a function of the device path in response to invocation of the firmware method;
   wherein the device manager is further to establish a trusted I/O channel with the I/O device with the channel identifier in response to a determination of the channel identifier.

2. The computing device of claim 1, wherein to identify the firmware method comprises to identify a node in a firmware table.

3. The computing device of claim 2, wherein the firmware table comprises an ACPI table and the node comprises an ACPI object.

4. The computing device of claim 2, wherein:
   the I/O device comprises a static device; and
   to identify the node in the firmware table comprises to identify a device node with the device path.

5. The computing device of claim 2, wherein:
   the I/O device comprises a dynamically attached device coupled to an I/O controller of the computing device; and
   to identify the node in the firmware table comprises to identify a controller node associated with the I/O controller with the device path.

6. The computing device of claim 1, wherein:
   the I/O device comprises a dynamically attached device coupled to an I/O controller of the computing device; and
   to determine the channel identifier comprises to determine the channel identifier as a function of the device path using a first stable algorithm.

7. The computing device of claim 6, wherein the I/O controller of the computing device comprises:
   a dynamic device manager to detect dynamic attachment of the I/O device; and
   a controller device mapper to determine the channel identifier as a function of the device path with the first stable algorithm in response to detection of the dynamic attachment of the I/O device.

8. The computing device of claim 7, wherein the device path comprises a controller path and a bus path, wherein the controller path identifies the I/O controller, and wherein the bus path comprises a path of the I/O device relative to the I/O controller.

9. The computing device of claim 8, wherein to determine the channel identifier as a function of the device path with the first stable algorithm comprises to determine the channel identifier as a function of the controller path and the bus path.

10. The computing device of claim 9, wherein to determine the channel identifier as a function of the controller path and the bus path comprises to:
    determine one or more upper bits of the channel identifier as a function of a predetermined channel identifier associated with the I/O controller; and
    determine one or more lower bits of the channel identifier as a function of the bus path.

11. The computing device of claim 1, further comprising:
    an operating system that comprises the device manager and the firmware interface; and
    a firmware environment that comprises the firmware device mapper.

12. A method for device identifier mapping, the method comprising:
    determining, by a computing device, a device path to an I/O device of the computing device;
    identifying, by the computing device, a firmware method as a function of the device path;
    invoking, by the computing device, the firmware method;
    determining, by the computing device, a channel identifier as a function of the device path in response to invoking the firmware method; and
    establishing, by the computing device, a trusted I/O channel with the I/O device using the channel identifier in response to determining the channel identifier.

13. The method of claim 12, wherein identifying the firmware method comprises identifying a node in a firmware table.

14. The method of claim 13, wherein:
    the I/O device comprises a static device; and
    identifying the node in the firmware table comprises identifying a device node using the device path.

15. The method of claim 13, wherein:
the I/O device comprises a dynamically attached device coupled to an I/O controller of the computing device; and
identifying the node in the firmware table comprises identifying a controller node associated with the I/O controller using the device path.

16. The method of claim 12, wherein:
the I/O device comprises a dynamically attached device coupled to an I/O controller of the computing device; and
determining the channel identifier comprises determining the channel identifier as a function of the device path using a first stable algorithm.

17. The method of claim 16, further comprising:
detecting, by the I/O controller of the computing device, dynamic attachment of the I/O device; and
determining, by the I/O controller, the channel identifier as a function of the device path using the first stable algorithm in response to detecting the dynamic attachment of the I/O device.

18. The method of claim 17, wherein the device path comprises a controller path and a bus path, wherein the controller path identifies the I/O controller, and wherein the bus path comprises a path of the I/O device relative to the I/O controller.

19. One or more non-transitory, computer-readable storage media comprising a plurality of instructions stored thereon that, in response to being executed, cause a computing device to:
determine a device path to an I/O device of the computing device;
identify a firmware method as a function of the device path;
invoke the firmware method;
determine a channel identifier as a function of the device path in response to invoking the firmware method; and
establish a trusted I/O channel with the I/O device using the channel identifier in response to determining the channel identifier.

20. The one or more non-transitory, computer-readable storage media of claim 19, wherein to identify the firmware method comprises to identify a node in a firmware table.

21. The one or more non-transitory, computer-readable storage media of claim 20, wherein:
the I/O device comprises a static device; and
to identify the node in the firmware table comprises to identify a device node using the device path.

22. The one or more non-transitory, computer-readable storage media of claim 20, wherein:
the I/O device comprises a dynamically attached device coupled to an I/O controller of the computing device; and
to identify the node in the firmware table comprises to identify a controller node associated with the I/O controller using the device path.

23. The one or more non-transitory, computer-readable storage media of claim 19, wherein:
the I/O device comprises a dynamically attached device coupled to an I/O controller of the computing device; and
to determine the channel identifier comprises to determine the channel identifier as a function of the device path using a first stable algorithm.

24. The one or more non-transitory, computer-readable storage media of claim 23, further comprising a plurality of instructions stored thereon that, in response to being executed, cause the computing device to:
detect, by the I/O controller of the computing device, dynamic attachment of the I/O device; and
determine, by the I/O controller, the channel identifier as a function of the device path using the first stable algorithm in response to detecting the dynamic attachment of the I/O device.

25. The one or more non-transitory, computer-readable storage media of claim 24, wherein the device path comprises a controller path and a bus path, wherein the controller path identifies the I/O controller, and wherein the bus path comprises a path of the I/O device relative to the I/O controller.

* * * * *